US011333540B2

(12) United States Patent
Haag et al.

(10) Patent No.: US 11,333,540 B2
(45) Date of Patent: May 17, 2022

(54) SENSOR BYPASS FOR GAS METERS

(71) Applicant: Itron Global SARL, Liberty Lake, WA (US)

(72) Inventors: Christian Oskar Haag, Philippsburg (DE); Kanako Nenninger-Abe, Baden-Wur (DE); Manfred Einhaus, Baden-Wur (DE)

(73) Assignee: Itron Global SARL, Liberty Lake, WA (US)

( * ) Notice: Subject to any disclaimer, the term of this patent is extended or adjusted under 35 U.S.C. 154(b) by 224 days.

(21) Appl. No.: 16/725,591

(22) Filed: Dec. 23, 2019

(65) Prior Publication Data

US 2021/0190568 A1    Jun. 24, 2021

(51) Int. Cl.
*G01F 15/18*    (2006.01)
*G01F 7/00*    (2006.01)

(52) U.S. Cl.
CPC ............. *G01F 15/185* (2013.01); *G01F 7/00* (2013.01)

(58) Field of Classification Search
CPC .................................................. G01F 15/185
See application file for complete search history.

(56) References Cited

U.S. PATENT DOCUMENTS

| 5,509,305 | A | * | 4/1996 | Husain | G01F 1/10 |
| | | | | | 73/195 |
| 5,868,155 | A | * | 2/1999 | Hutton | G01F 15/185 |
| | | | | | 137/240 |
| 2016/0341584 | A1 | * | 11/2016 | Naganuma | G01F 1/66 |
| 2016/0370215 | A1 | * | 12/2016 | Satou | G01F 15/14 |

\* cited by examiner

*Primary Examiner* — Paul M. West
*Assistant Examiner* — Mark A Shabman
(74) *Attorney, Agent, or Firm* — Lee & Hayes, P.C.

(57) ABSTRACT

A gas meter having a sensor module and at least one bypass module is described herein. In an example of the gas meter, an enclosure defines an interior cavity within which a manifold may be configured to include a sensor module connector, at least one bypass module connector, and an exhaust port. A sensor module may be connected to the sensor module connector of the manifold and may measure a flowrate through the sensor module and into the manifold. A bypass module may be connected to the bypass module connector of the manifold to bypass gas around the sensor module. A processor may be used to compute a gas flowrate through the meter using inputs including the measured flowrate and data based on the measured flowrate to adjust for gas that bypassed the sensor module.

20 Claims, 16 Drawing Sheets

SENSOR BYPASS FOR GAS METERS

BACKGROUND

Flow sensors used in residential gas meters, e.g., a G4 meter, are typically tailored for measurement of gas within a volume range of about 0.04 to 6 cubic meters per hour. Such sensors are mass-marketed and are less expensive than sensors used for other ranges of gas flowrates. Sensors for gas meters having a higher gas flowrate capacity (e.g., G6, G10 and G25 meters) may be custom designed. Accordingly, higher-capacity gas meters are expensive.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1:
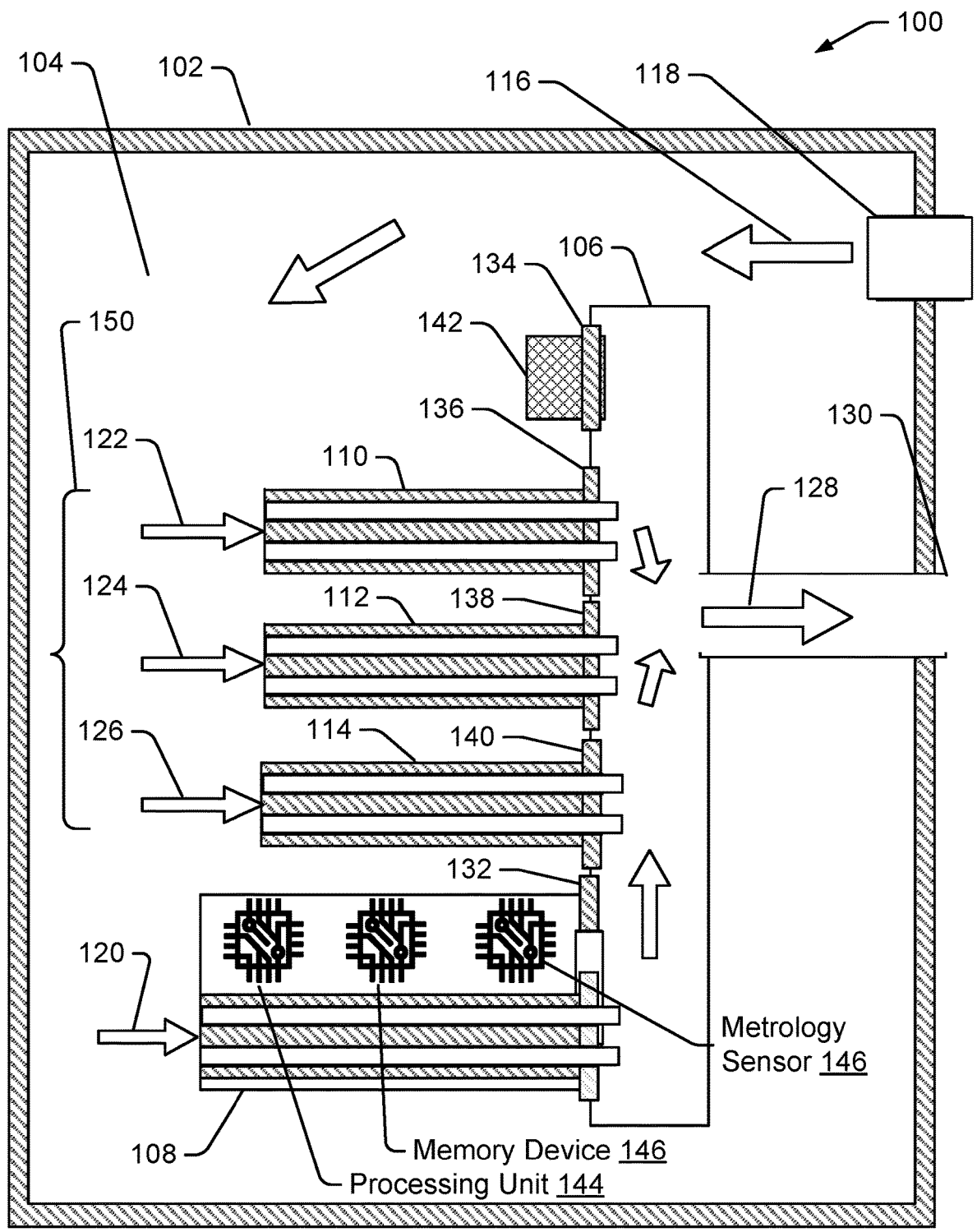
FIG. 1 is a cross-sectional diagram showing an example gas meter having a manifold located within an interior cavity and showing a sensor module and a plurality of bypass modules attached to the manifold.

The disclosure describes structures and techniques for using a gas sensor that is designed to measure a range of gas flowrates that is less than a range of gas flowrates moving through a gas meter. In an example gas meter, a portion of the gas-flow through the meter passes through the gas sensor, and a portion of the gas-flow through the meter passes through at least one bypass module, thereby bypassing the gas sensor module. The total gas-flow through the meter may be determined based in part on measurements made by the gas sensor and based in part on calculations performed on those measurements, wherein the calculations account for gas passing the sensor and going through the bypass module(s).

An example gas meter includes a sensor module and at least one bypass module. An enclosure of the gas meter may define an interior cavity within which a manifold may be configured to include at least one sensor module connector, a plurality of bypass module connectors (which may be the same as the sensor module connector(s)), and an exhaust port. A sensor module may be connected to the sensor module connector of the manifold and may measure a volume of the first gas-flow that flows through the sensor module and into the manifold. A plurality of bypass modules may be connected to the plurality of bypass module connectors of the manifold, respectively, and may be configured to collectively allow a second gas-flow to flow through the plurality of bypass modules, to bypass the sensor module, to flow into the manifold, and to flow out of the exhaust port. A total gas-flow through the meter may be determined based in part on output from the gas sensor module and based in part on calculations performed on that output.

In a first example of the calculations, a percentage of the gas passing through the gas meter that passes through the sensor module is a known constant value at different pressures and/or different flowrates through the gas meter. In this example, the total gas flowing through the meter may be determined based on measurements by the sensor module, multiplied by a value according to this known percentage.

In a second example of the calculations, a percentage of the gas passing through the meter that passes through the sensor module is a known function of the gas flowrate measured by the sensor module. That is, the percentage of gas flowing through the gas sensor module (with the remainder of the gas flowing through the bypass module) is variable and is related to the flowrate measured by the gas sensor module. In this example, the total gas flowrate or volume flowing through the meter may be determined by multiplying the measured gas flowrate by an appropriate, known and/or predetermined value. The value may be a function of the measured gas flowrate value indicated by the sensor module; i.e., the value may be obtained using the measured gas flowrate. Once the measured gas flowrate is obtained, the factor used to determine overall gas flowrate may be obtained from a function, a lookup table, or other means.

Example System and Techniques

FIG. 1 shows an example gas meter 100 having an enclosure 102, defining an interior cavity 104. A manifold 106 is located within the interior cavity. A sensor module 108 and a representative plurality of bypass modules 110, 112, 114 are shown attached to the manifold 106. In the example shown, a first gas flow 116 enters the interior cavity 104 of the gas meter 100 through an input port 118. A second gas flow 120 leaves the interior cavity 104 passes into the gas sensor 108. Other gas flows 122, 124, 126 leave the interior cavity 104, and bypass the gas sensor 108, by passing through bypass modules 110, 112, 114. In an example, the gas flow 120 may be approximately equal to (e.g., within 10%) the gas flow 122 through one of the bypass modules. The gas flows 122, 124, 126 may be approximately equal or may be significantly different. The gas flows 120, 122, 124, 126 are unified within the manifold 106, and the outgoing gas flow 128 leaves the gas meter 100 at exhaust port 130. In a further example, the plurality of bypass modules may include bypass modules having at least two different cross-sectional areas and/or lengths over which gas travels within each bypass module. The plurality of bypass modules may be configured to allow passage of a bypass gas flow that results in a gas flow through the sensor module to be within an operating range of the sensor module.

Accordingly, the manifold 106 is configured with sensor module connector(s) and bypass module connector(s). Appropriate sensor module(s) and/or bypass module(s) may be selected and attached to the manifold, according to design requirements, parameters, component availability and component costs. The manifold therefore assists in the design and construction of a gas meter for use with larger customers, which uses a sensor module designed for smaller customers.

The example manifold 106 includes one or more each of sensor module connector(s) and bypass module connector(s). In the example shown, sensor module connector 132 allows connection of the sensor module 108. While only one sensor module connector and one sensor module are shown, additional sensor module connector(s) may be included on the manifold 106, with appropriate sensor module(s) installed. If the additional sensor module connectors are not needed, they may be plugged.

In the example shown, bypass module connectors 134, 136, 138, 140 allow connection of a bypass module or a plug. In the example shown, bypass module connector 134 is connected to a plug 142, which prevents gas from leaving the interior cavity 104 and entering the manifold 106. Also shown, bypass module connectors 136, 138, 140 allow connection of bypass modules 110, 112, 114, respectively. The bypass modules 110-114 allow gas to bypass the sensor 108. In an example, the volume of gas bypassing the sensor is accounted for by use of mathematical relationships between the gas volume measured by the sensor and the characteristics of the bypass modules attached to the manifold.

The sensor module 108 shows a representative design; however, different designs may alternatively be used, which locate processor(s), memory device(s) and/or metrology sensor(s) in alternative locations. The sensor module 108 shown includes a processing device 144, memory device 146 and metrology sensor 148. In other configurations, the processor 144 and/or memory 146 may be located in a different part of the gas meter 100.

In the example shown, a first gas flow 116 enters an interior cavity 104 of the gas meter 100. A second flow 120 leaves the interior cavity and passes through the sensor module 108. A third flow 150 includes gas flows 122, 124, 126, which pass through bypass modules 110, 112, 114. In operation, the gas meter 100 determines the gas flow 116 by actual measurement of the gas flow 120 passing through the sensor 108, and by estimation of the gas flows 150 passing through the bypass modules 110, 112, 114. The estimation may be performed by operation of the processing unit 144, using instructions and data stored on the memory device 146.

Figure 2:
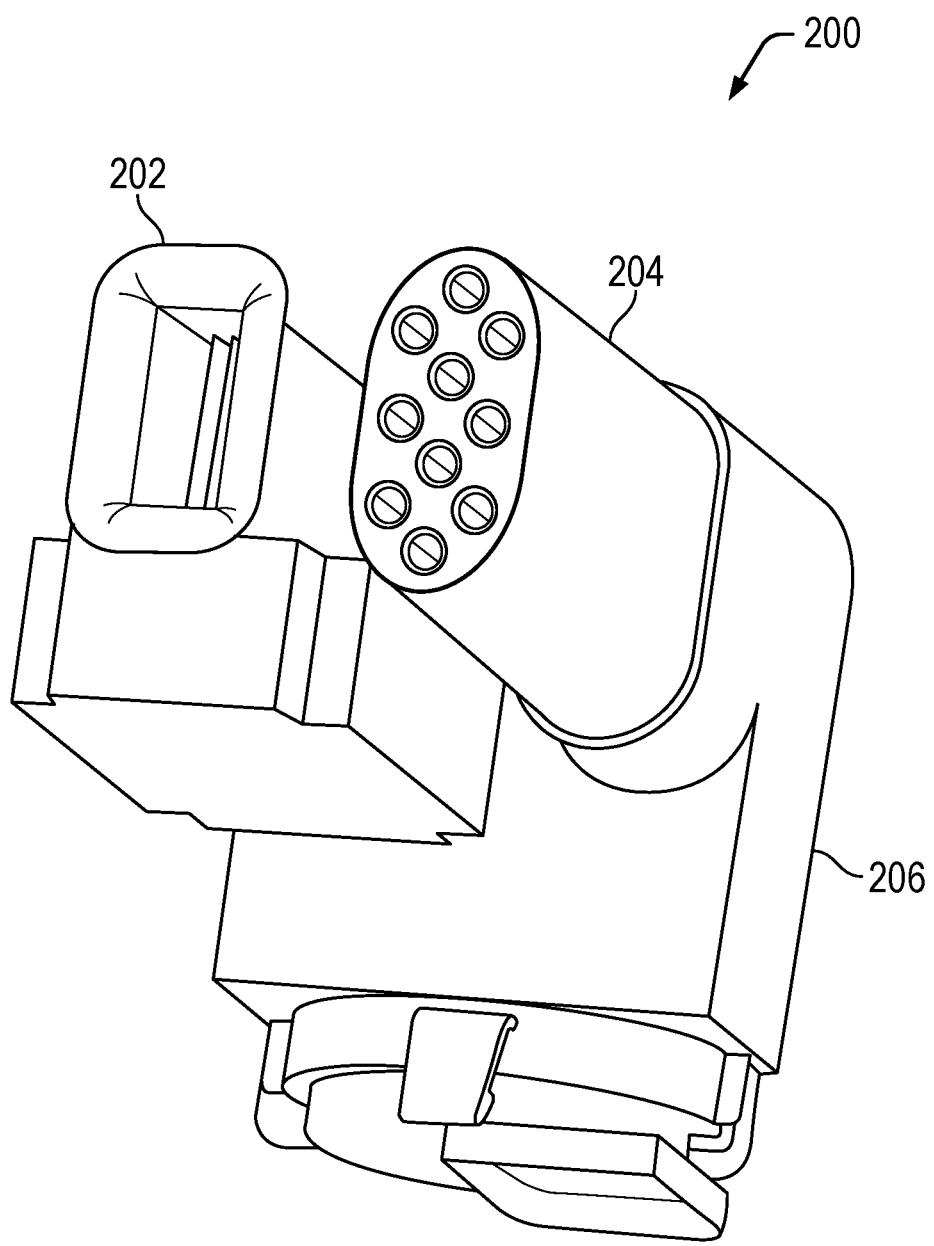
FIG. 2 is a view of an example manifold having an attached sensor module and a single attached bypass module.

FIG. 2 shows an example manifold assembly 200 configured for installation within a gas meter (not shown). A sensor module 202 is attached to a manifold 206 of the manifold assembly 200. The sensor module 202 may be configured for use without a bypass module in a smaller meter (e.g., a meter for a residential or small business customer). However, with a bypass module, the sensor module may be used in a mid-sized gas meter. In the example shown, a sensor module 202 and a single bypass module 204 are attached to the manifold 206. The sensor module 202 is configured to measure a first portion of the gas flowing through the meter. The bypass module 204 is configured to allow a second portion of the gas flowing through the meter to bypass the sensor module. Accordingly, measurement of the gas flowing through the meter is based on measurement of a quantity of gas measured by the sensor module 202, and a calculation based on characteristics of the bypass module 204 installed in the manifold 206. In an example, a look-up table provides a relationship between different measured flowrates of gas (measured by the sensor module 202) and associated percentages of gas that pass through the bypass module 204 at those measured flowrates.

Thus, a ratio of a first flowrate of the first gas flow through a sensor module and a second flowrate of a second gas flow through one or more bypass modules may be variable over a range of gas flowrates and/or pressures at an entry port of a gas meter. In such an example, the gas meter may additionally include a processor to compensate for the variability of the ratio by adjusting a calculation of total gas flow, wherein the adjusting of the calculation is based at least in part on a changing gas flowrate measured by the sensor module. In an example, a lookup table may be created with different measured flowrates and the percentage of gas that went though the sensor module and/or the percentage of gas that went through the bypass module(s). This lookup table may be created experimentally for each meter design, or for each meter manufactured.

In a further example, the bypass module 204 may be constructed to bypass a fixed percentage of the gas flowing through the gas meter at all flowrates or gas pressures appropriate for a particular design-requirement. Thus, a ratio of a first rate of the first gas flow through a sensor module and a second rate of the second gas flow through one or more bypass modules may be fixed over a range of gas flowrates and/or gas pressures at an entry port of a gas meter. In such an example, the gas meter may additionally include a processor to calculate the total gas flow, such as by multiplying by an appropriate factor.

Figure 3:
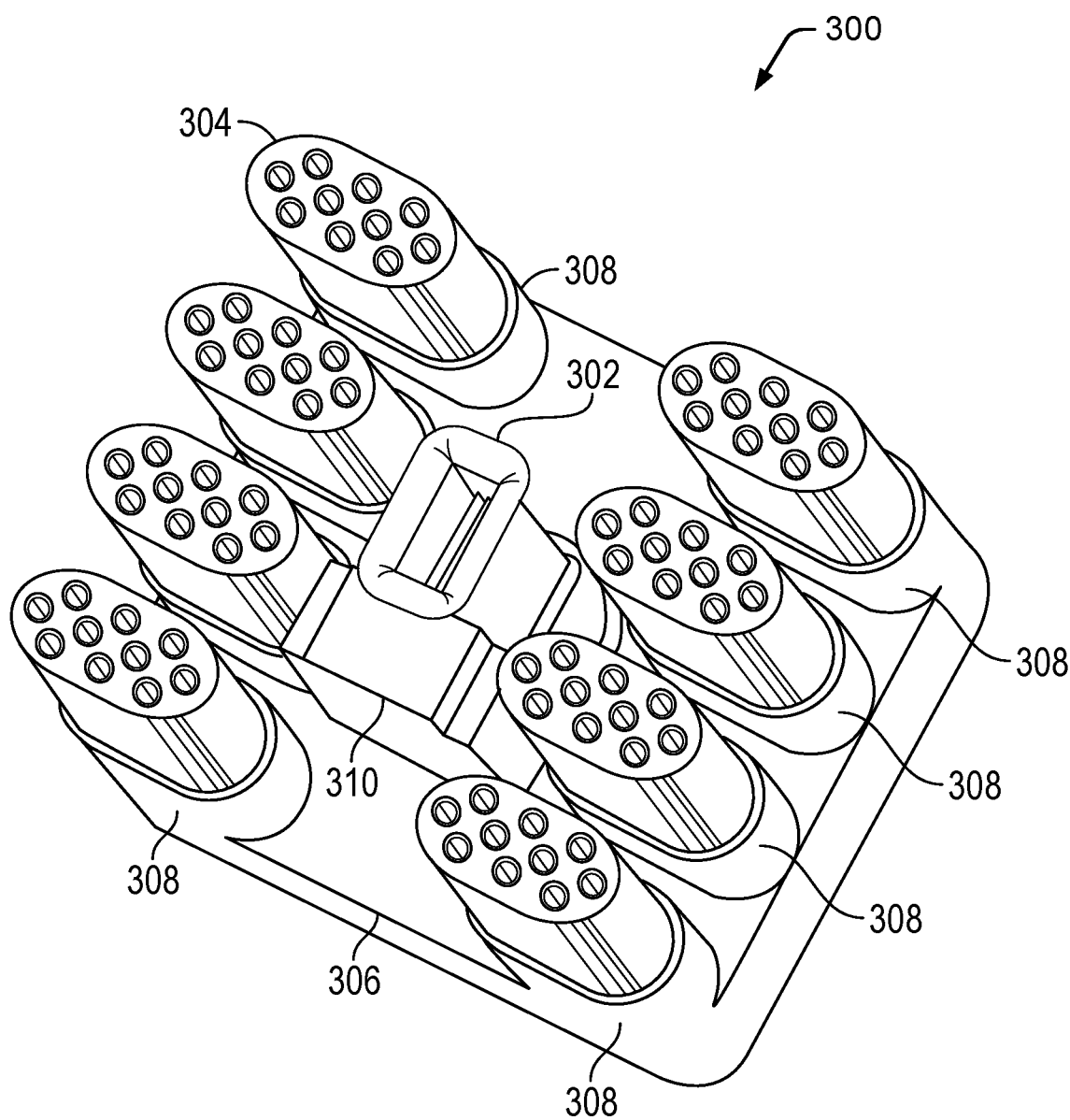
FIG. 3 is a view of an example manifold having an attached sensor module and eight attached bypass modules.

FIG. 3 shows an example manifold assembly 300 configured for installation within a gas meter (not shown). The gas meter may be configured to measure larger volumes of gas flow than the gas meter of FIG. 2, and may use the same or different sensor module. In the example shown, the sensor module 302 may be configured for use without a bypass module in a smaller meter (e.g., a meter for a residential or small business customer). However, with bypass module(s), the sensor module 302 may be used in a larger gas meter. In the example shown, a sensor module 302 and a plurality of bypass modules 304 are attached to the manifold 306. The sensor module 302 is configured to measure a first portion of the gas flowing through the meter. Collectively, the bypass modules 304 are configured to allow a second portion of the gas flowing through the meter to bypass the sensor module 302. Accordingly, measurement of the gas flowing through the meter is based on measurement of a quantity of gas measured by the sensor module 302, and a calculation based on characteristics of the plurality of bypass modules 304 installed in the manifold 306.

In an example, the sensor module 302 includes an enclosure 310, which may include a processing unit, memory device, and/or a metrology sensor. Accordingly, the sensor module 302 may be configured in the manner of sensor module 108 of FIG. 1, with processing unit 144, memory device 146, and metrology sensor 148. The metrology sensor 148 may be an ultrasonic measuring unit (UMU) or may use other technology as indicated by design requirements.

A plurality of connectors 308 may each be configured to allow connection of a bypass module 304 or a "plug" or stopper (now shown) to prevent gas flow. Accordingly, the same manifold 306 may be used with differing numbers of bypass modules 304 to create the desired manifold assembly 300.

In one example, all of the plurality of bypass modules 304 may be of the same type, design, size and/or shape, and may be configured to allow the same gas flowrates under like conditions and/or pressures. Accordingly, the same factor could be used to derive the total flowrate from the measured flowrate at all flowrates.

Alternatively, bypass modules having two or more designs, sizes and/or shapes may be selected and used as the plurality of bypass modules. Such diverse bypass modules may be of different type, design, size and/or shape, and may be configured to allow different gas flowrates under like conditions and/or pressures. Advantageously, bypass modules having different characteristics may be selected to allow a desired percentage(s) of the gas flowing through the gas meter to bypass the sensor module over an anticipated range of gas flows through the meter.

Additionally or alternatively, while one sensor module is shown, a bypass module(s) could be replaced by an additional sensor module(s). This would allow a gas meter to measure a greater percentage of the gas flow, and would allow the data from the sensor modules to be compared and contrasted. The data would also allow for the generation of diagnostics, for the performance of self-tests, and for greater flexibility in the design and operation of gas meters configured with two or more sensor modules.

At setup and/or manufacture, at each measured flowrate, a factor is derived (e.g., and added to a lookup table) for use in deriving the total flowrate through the meter. In some example, the factor is adjusted as the gas meter ages.

Figure 4:
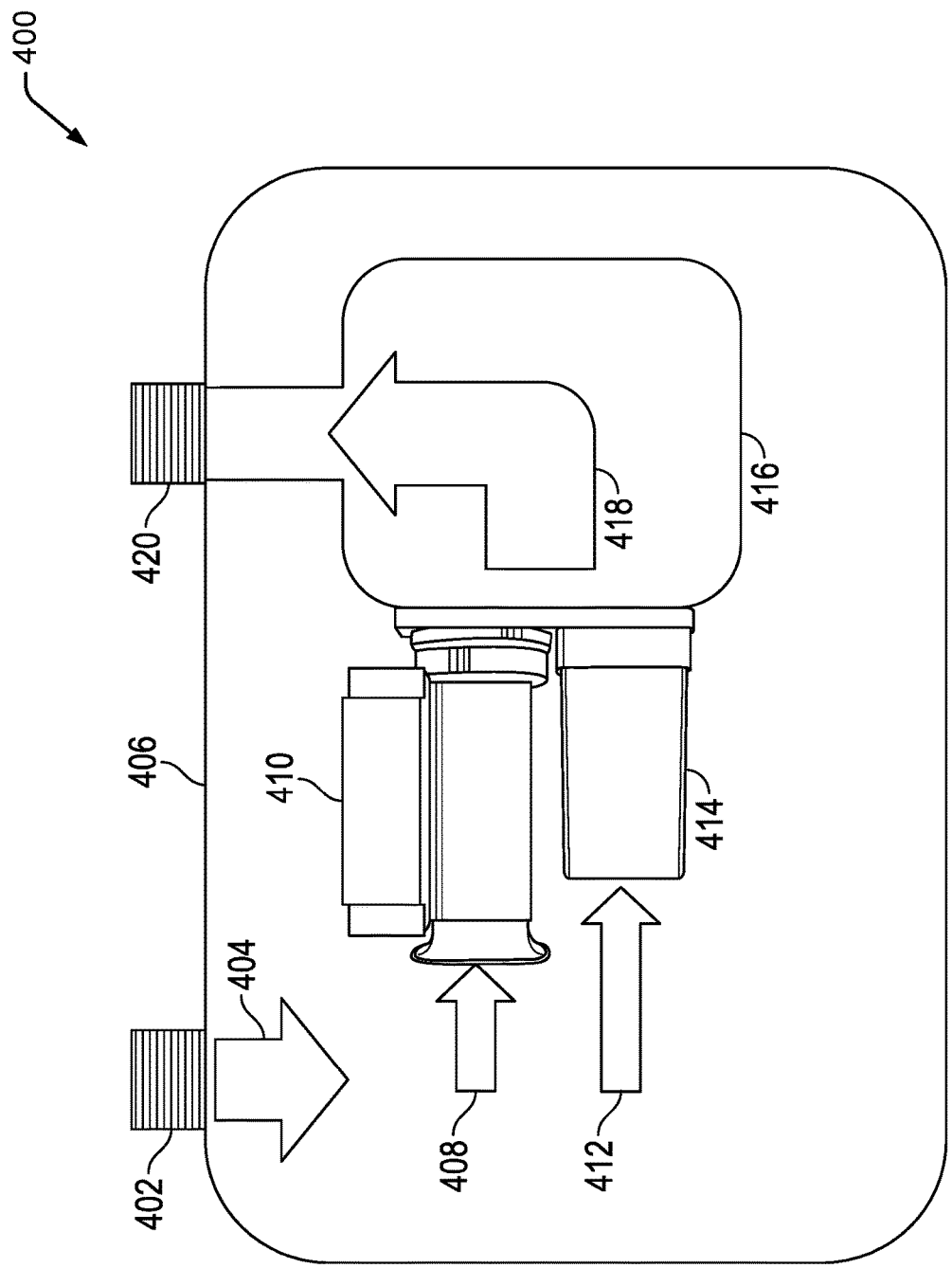
FIG. 4 is a diagram showing an example gas meter, showing gas flows passing through an interior of the enclosure of the gas meter, a sensor module, a bypass module and a manifold.

FIG. 4 shows an example gas meter 400. In the example shown, a gas flow enters the meter, and within the enclosure of the meter the flow is bifurcated, with separate flows passing through either a sensor module or a bypass module that allows gas to "bypass" the sensor module. The gas flows may be reunified in a manifold before exiting the meter.

The example meter 400 includes a measuring, sensor and/or metrology module and a bypass module. The bypass module allows gas to "bypass" the measuring module, thereby allowing utilization of a less expensive sensor module. Gas that bypasses the sensor/metrology module is accounted for by the meter 400. In the example shown, the sensor module and the bypass module are connected to a manifold, which is connected to an outlet of the meter. In the example, the bypass module may have a conic shape and a slot, wherein an opening angle of the bypass module is calculated to create a bypass ratio which depends on, or is a function of, the measured flowrate. In an example, the bypass ratio could than have the response that is similar to FIG. 19. The bypass ratio may be the ratio of gas passing through the sensor module divided by the gas passing through the bypass module. In some examples, the bypass ratio is the ratio of gas passing through the sensor module divided by the total gas passing through the meter. In other examples, the numerator and denominator of the ratio could be reversed. Accordingly, the bypass ratio is a ratio, equation and/or relationship that relates two or more of measured, unmeasured and/or total gas, and allows calculation of the overall gas flowrate and/or volume using the measured gas flowrate and/or volume.

The design of the example meter 400 allows the minimization or reduction of measurement uncertainty at low flowrates (where pressure drop is not problematic) and reduces or minimizes pressure drop at higher flowrates (where measurement uncertainty is not problematic).

In the example shown, a threaded connector 402 allows a gas flow 404 to enter an enclosure 406 of the meter 400. A first flow 408 of gas from within the enclosure 406 passes into and through a sensor module or metrology module 410. A second flow 412 gas from within the enclosure 406 passes into and through a bypass module 414. The first gas flow 408 and the second gas flow 412 are unified within the manifold 416, and a unified gas flow 418 exits the meter 400 at threaded connector 420.

In the example gas meter 400 shown, there is only one bypass module 414 attached to the manifold 416. In other example gas meters, two or more bypass modules 414 could be attached to the manifold. In some examples wherein multiple bypass modules are used, the bypass modules are the same (e.g., same size, shape, length, etc.). In other examples wherein multiple bypass modules are used, the bypass modules may be configured according to two or more designs, each design having one or more differences from one or more other designs. In still other example meters, wherein one or more bypass modules are utilized, the bypass modules may be configured to have a size, shape and/or configuration that is the same, or substantially similar, to the gas-flow passages of the sensor module 410. In example use of one such bypass module, half the gas flow from the meter enclosure into the manifold would pass through the sensor module and half of the gas flow would pass through the bypass module. In example use of two such bypass modules, one-third of the gas flow from the meter enclosure into the manifold would pass through the sensor module and two-thirds of the gas flow would pass through the two bypass modules. In such examples, the percentage of the volume of the total gas flow passing through the meter could be derived by multiplying the measured gas flow by an appropriate factor.

Figure 5:
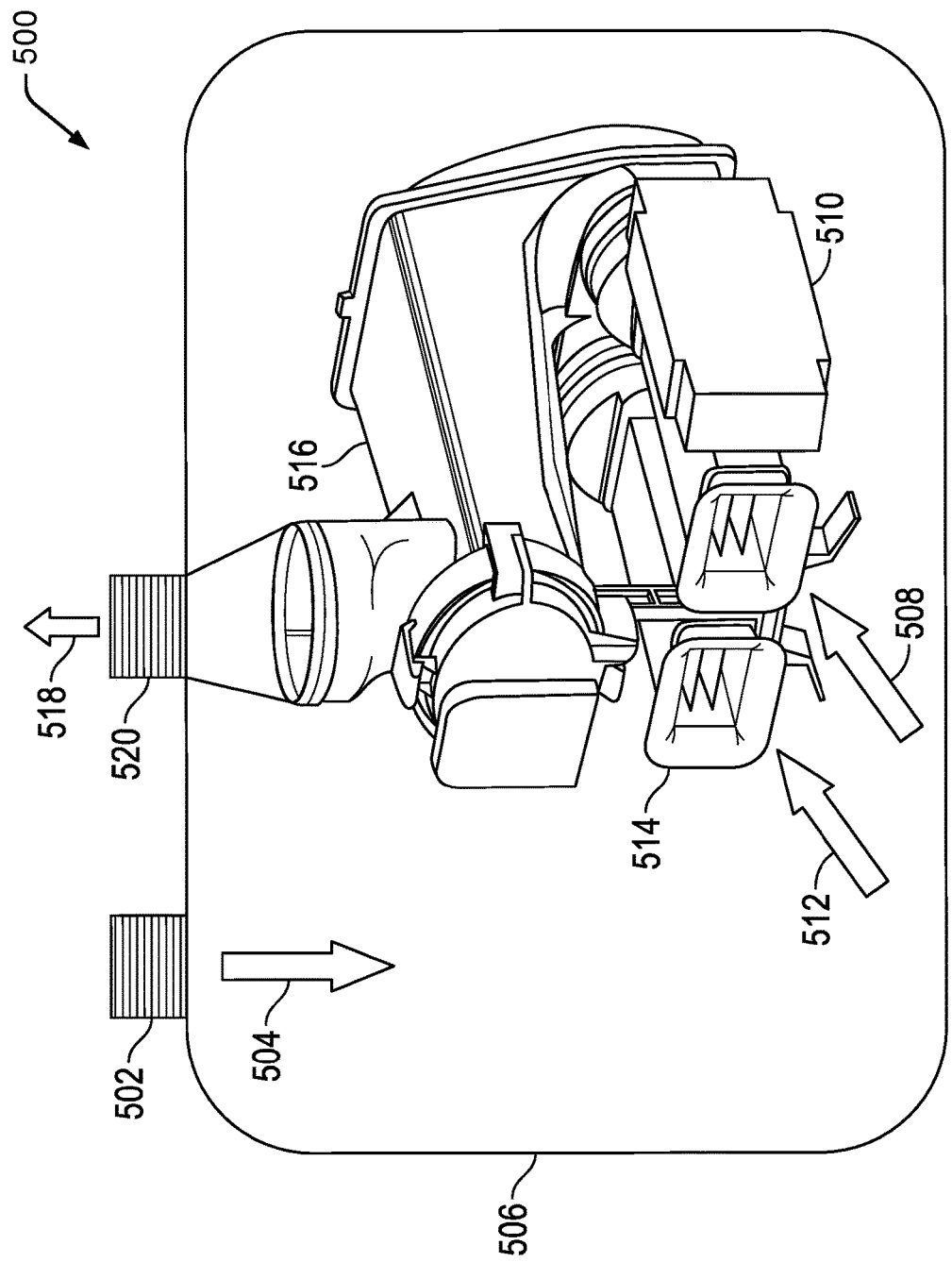
FIG. 5 is a perspective view of an example gas meter, showing an alternative manifold assembly design.

FIG. 5 shows an example gas meter 500, showing a manifold assembly having a different manifold than was shown in FIG. 4. In the example shown, a threaded connector 502 allows a gas flow 504 to enter an enclosure 506 of the meter 500. A first flow 508 of gas from within the enclosure 506 passes into and through a sensor module or metrology module 510. A second flow 512 gas from within the enclosure 506 passes into and through a bypass module 514. The first gas flow 508 and the second gas flow 512 are unified within the manifold 516, and a unified gas flow 518 exits the meter 500 at threaded connector 520.

Figure 6:
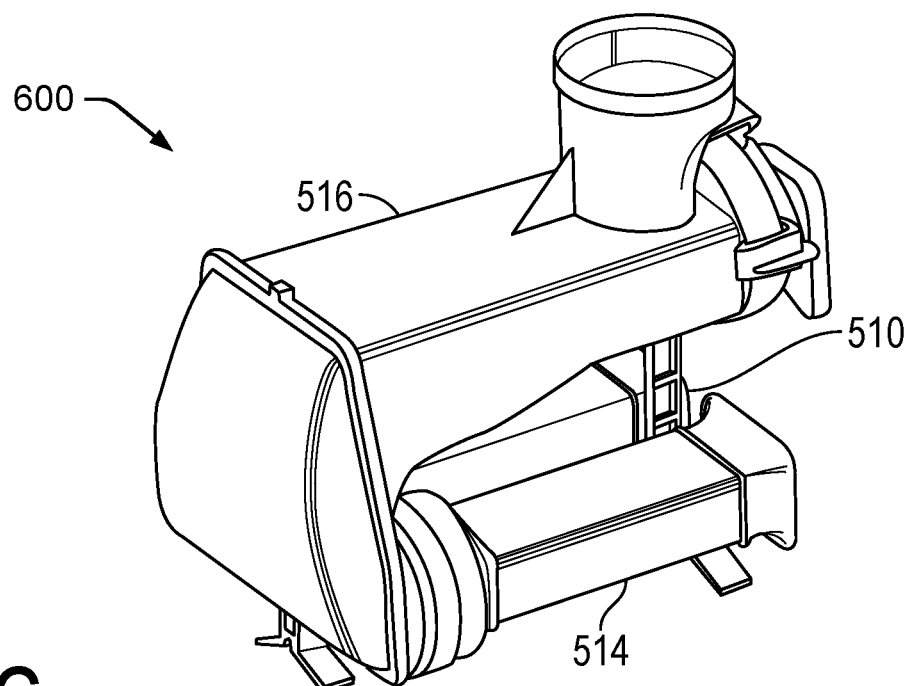
FIG. 6 is an additional perspective view of the manifold, sensor module and bypass module seen in FIG. 5.

FIG. 6 is an additional perspective view of the manifold assembly 600, rotated approximately 180-degrees and removed from the gas meter 500 of FIG. 5. The manifold 516 is configured for attachment of one bypass module 514 and the sensor module 510 (substantially obscured in the view of FIG. 1) to show the reverse side of the manifold.

Figure 7:
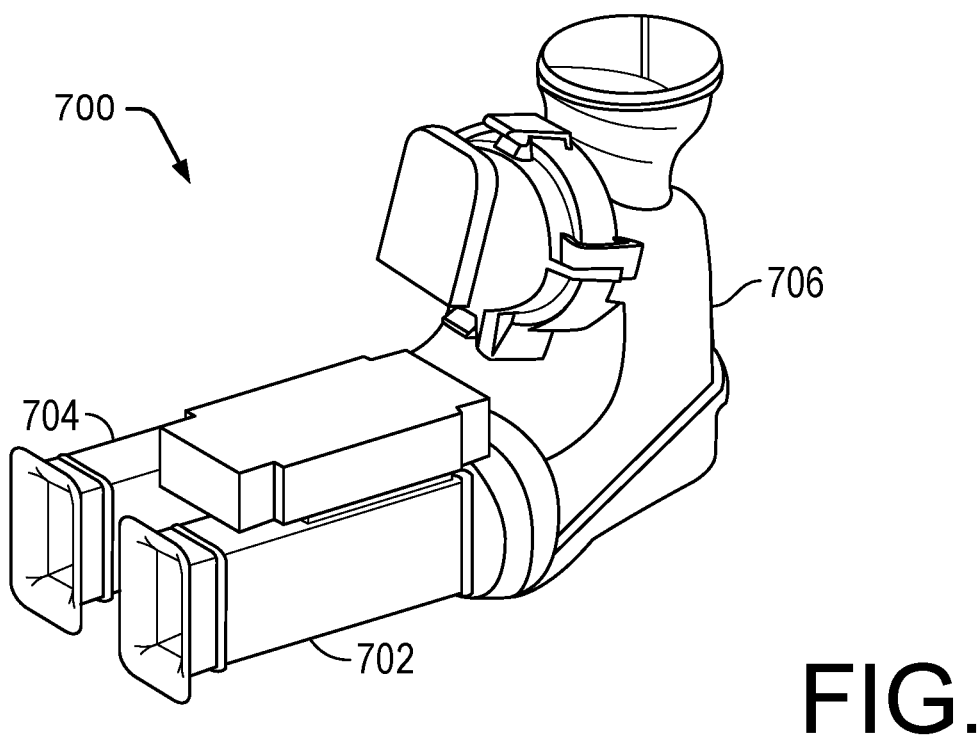
FIG. 7 is a perspective view of a further example of a manifold assembly, including a manifold with attached sensor and bypass modules.

FIG. 7 shows a further example of a manifold assembly 700, a sensor module and bypass module. In the example assembly 700, a sensor module 702 and a bypass module 704 are connected to a manifold 706.

Figure 8:
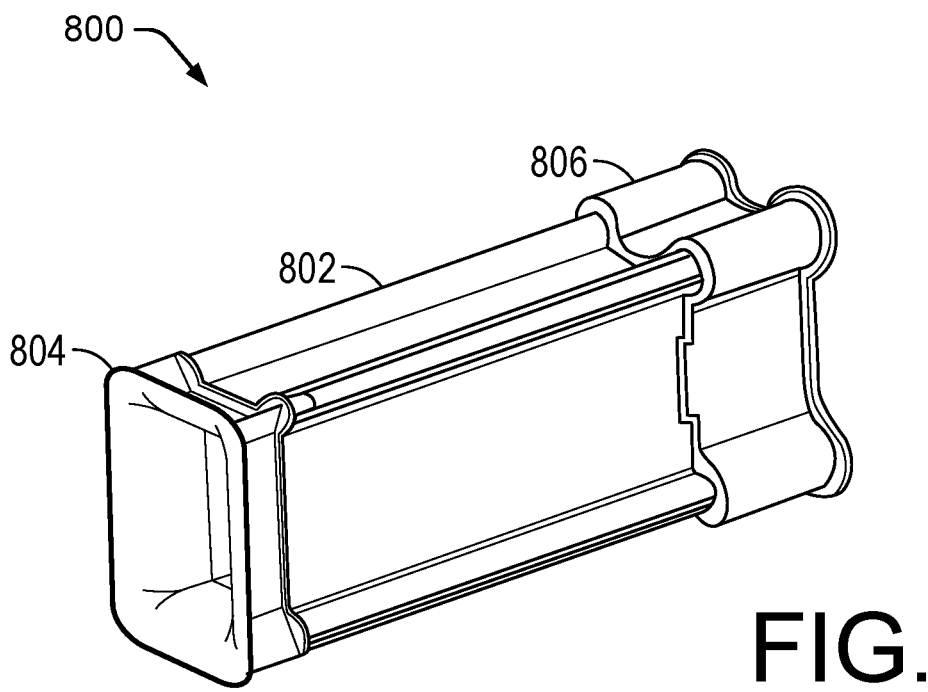
FIG. 8 is a perspective view of an example of a bypass module.

FIG. 8 shows an example bypass module 800. A tubular body 802 may be made of aluminum or aluminum alloy. An entry fixture 804 is configured to smooth the incoming gas flow and reduce turbulence. A footing 806 is configured to attach to a manifold (manifold not shown in this view).

Figure 9:
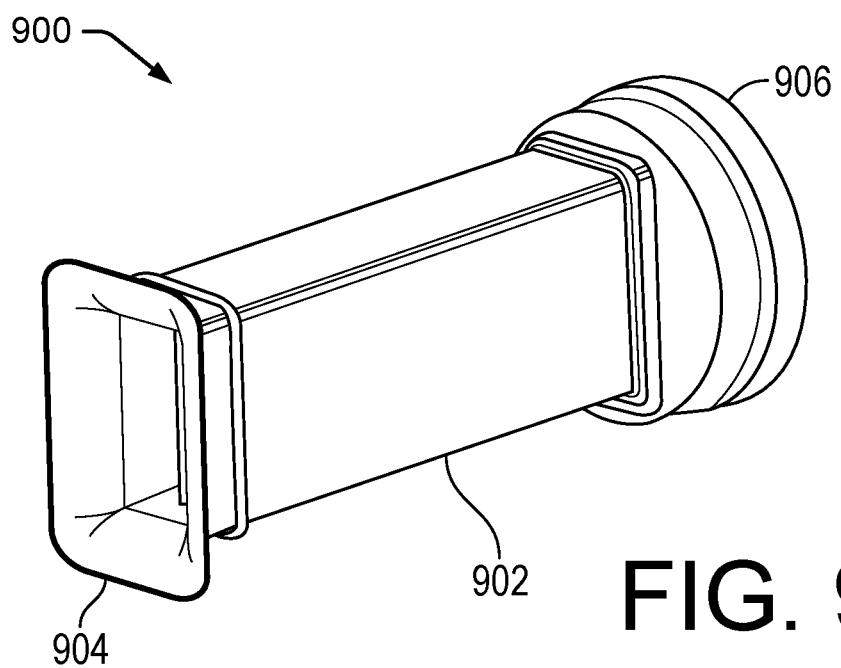
FIG. 9 is a perspective view of a further example of a bypass module.

FIG. 9 shows an example bypass module 900. A tubular body 902, entry fixture 904 and a footing 906 are made of a single material, such as plastic. The entry fixture 904 is configured to smooth the incoming gas flow and reduce turbulence. The footing 906 is configured to attach to a manifold (not shown).

Figure 10:
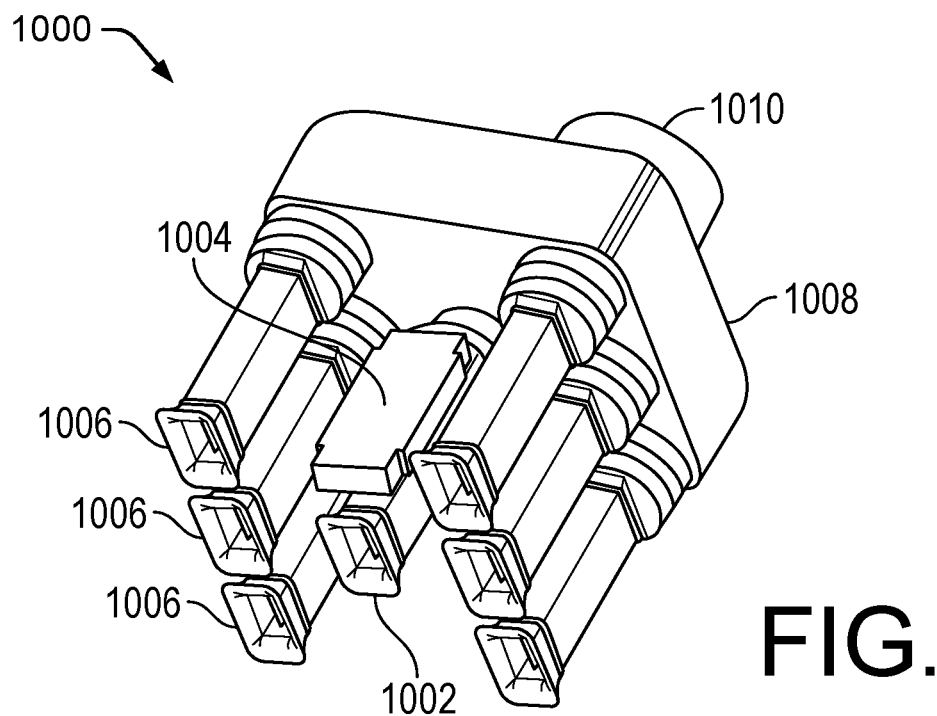
FIG. 10 is a perspective view of an additional example of a manifold, sensor module and bypass module.

FIG. 10 shows an additional example of a manifold assembly 1000. In the example, a sensor module and a plurality of bypass modules result in less measured gas flow and more bypassed gas flow. The sensor module 1002 is associated with an enclosure 1004, which may include a processing unit, memory device, and/or a metrology sensor. A plurality of bypass modules 1006 allow gas to enter the manifold 1008 without passing through the sensor module 1002. The manifold 1008 has an exhaust port 1010 which exhausts gas that has passed through any of the sensor module 1002 or bypass modules 1006.

FIG. 10 is shown with a manifold 1008 having a single sensor module 1002 and six bypass modules 1006. In an alternative, one or more of the bypass modules 1006 could be replaced by an additional sensor module 1002. This would result in a greater percentage of the overall gas flow going through a sensor module and a small percentage of the overall gas flow going through a bypass module. Additionally, this would provide two sources of gas flowrate data. These data flows could be compared over time, and diagnostics could be generated. In an example, degraded performance of one of the sensor modules may be assumed, if the percentage of the overall gas flow measured by the two sensor modules changes. Accordingly, while FIG. 10 shows one sensor module and six bypass modules, any number of sensor modules and bypass modules could be used. In a further example, where two or more sensor modules are used, one or more of the sensor modules may be turned off during period(s) of time, such as in response to higher or lower gas flows.

Figure 11:
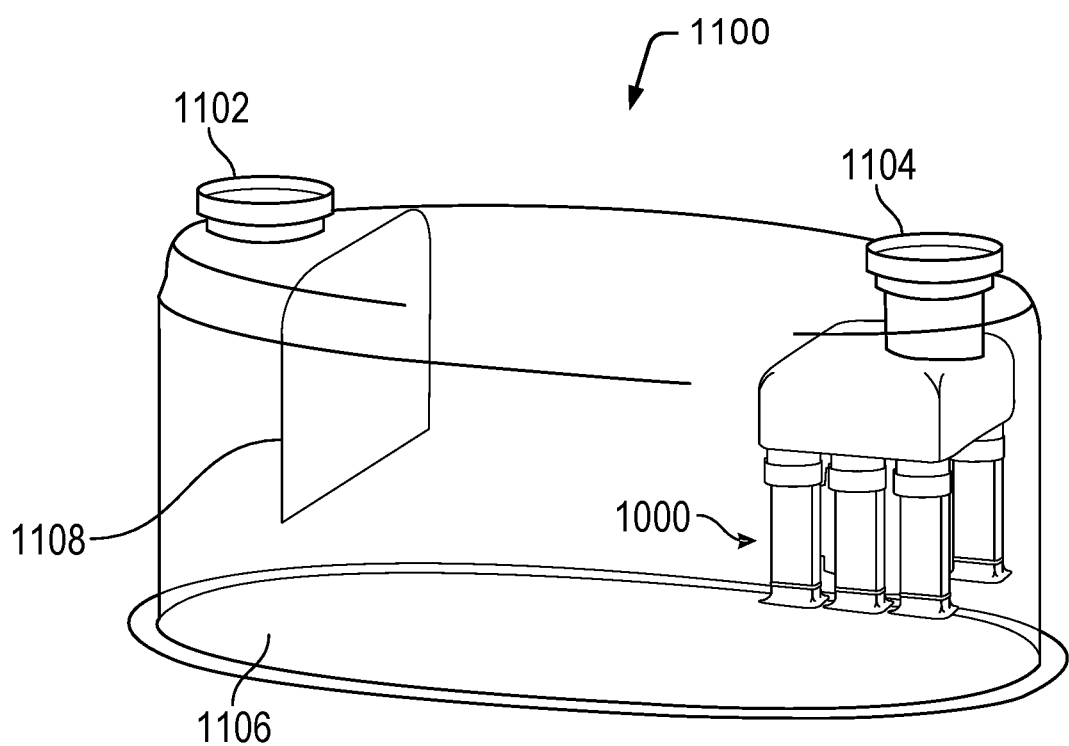
FIG. 11 is a perspective view of an example gas meter, showing the enclosure as partially transparent to provide a view of the interior of the meter.

FIG. 11 shows an example gas meter 1100. An entry port 1102 receives gas, such as from a utility company. An exit port 1104 exhausts gas after measurement, such as to a utility customer. The enclosure 1106 is shown as partially transparent to provide a view of the interior of the meter. Within the meter, the manifold assembly 1000 of FIG. 10 is shown. The manifold assembly 1000, with a sensor module and a plurality of bypass modules measures gas before it exits the meter at port 1104.

A deflector or baffle 1108 regulates the flow of gas from the entry port 1102 tends to reduce turbulence and create a more laminar flow of gas as it moves toward the manifold assembly 1000.

Figure 12:
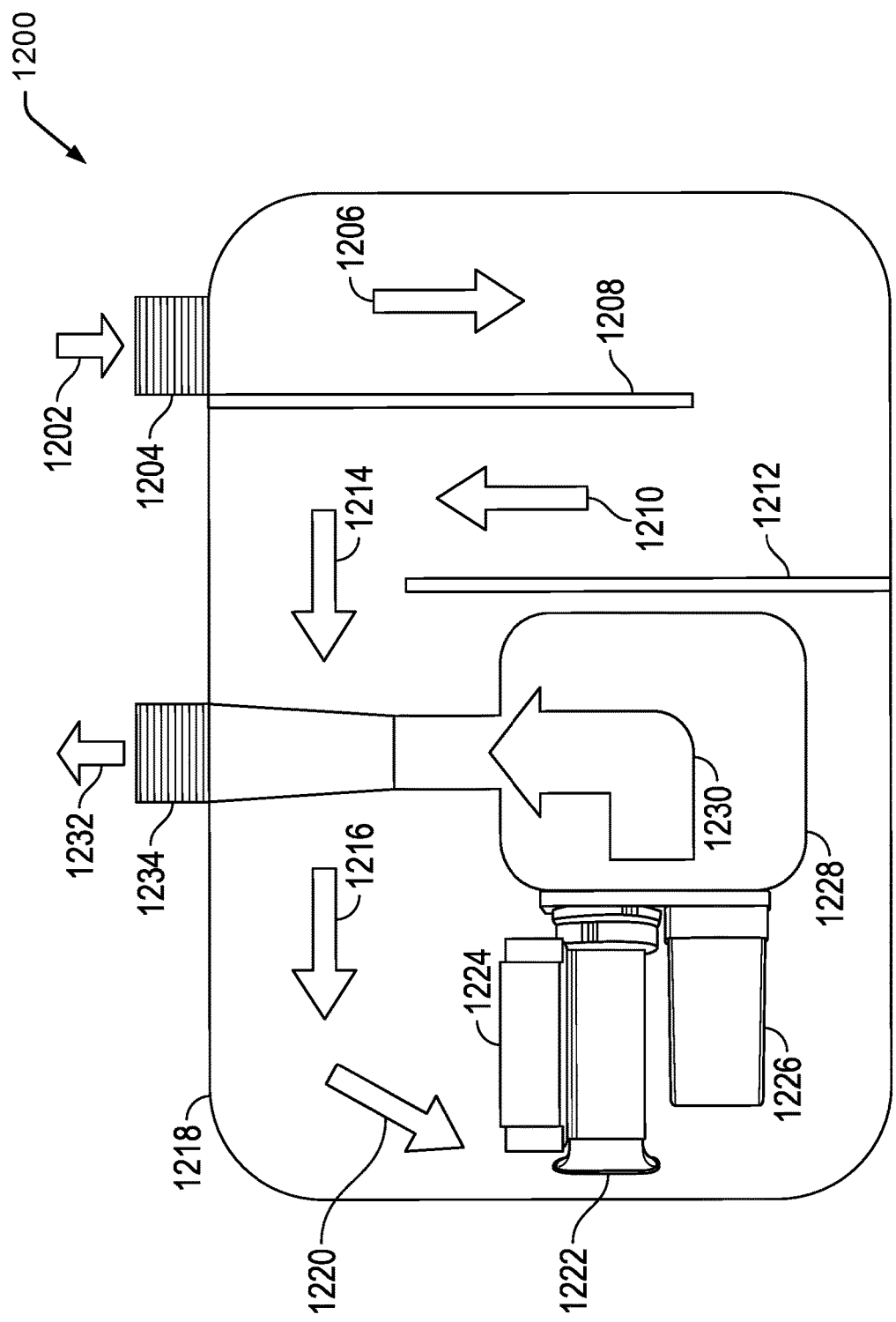
FIG. 12 is a diagram showing an example gas meter.

FIG. 12 shows an example gas meter 1200. Gas 1202 (e.g., from a utility company) enters the gas meter at entry port 1204. The gas flow 1206 is directed in part by a baffle 1208, which reduces turbulence. The gas flow 1210 travels between baffles 1208, 12012. The gas flow 1214 proceeds toward the opposite end of the gas meter, where gas flow 1216 is redirected by the inside surface of the enclosure 1218. Gas flow 1220 approaches the sensor module 1222, having an enclosure 1224 for a processor, memory, and a sensor device. Gas also enters a bypass module 1226. Within the module 1228, the gas flows from the sensor module 1222 and bypass module 1226 are unified as gas flow 1230. Gas flow 1232 then exits through exhaust port 1234.

The gas meter 1200 shows that one or more baffles 1208, 1212 can reduce turbulence and increase laminar gas flow characteristics. Also, by putting the input of the sensor module 1222 and the bypass module 1226 near a wall of the enclosure 1218, gas turbulence is also reduced. By reducing turbulence, a more accurate gas flowrate measurement is made.

Figure 13:
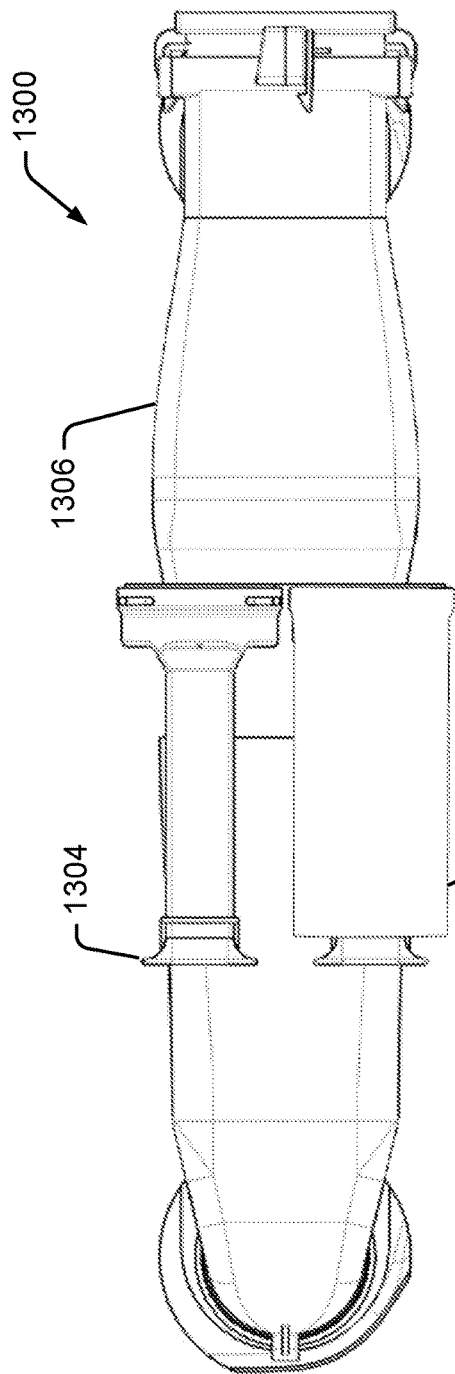
FIG. 13 is a bottom view of an example manifold, gas sensor module, and bypass module.

FIG. 13 shows a top view of an example manifold assembly 1300. The assembly includes a gas sensor module 1302, bypass module 1304, and manifold 1306. The sensor module 1302 and bypass module 1304 are attached to the manifold 1306.

Figure 14:
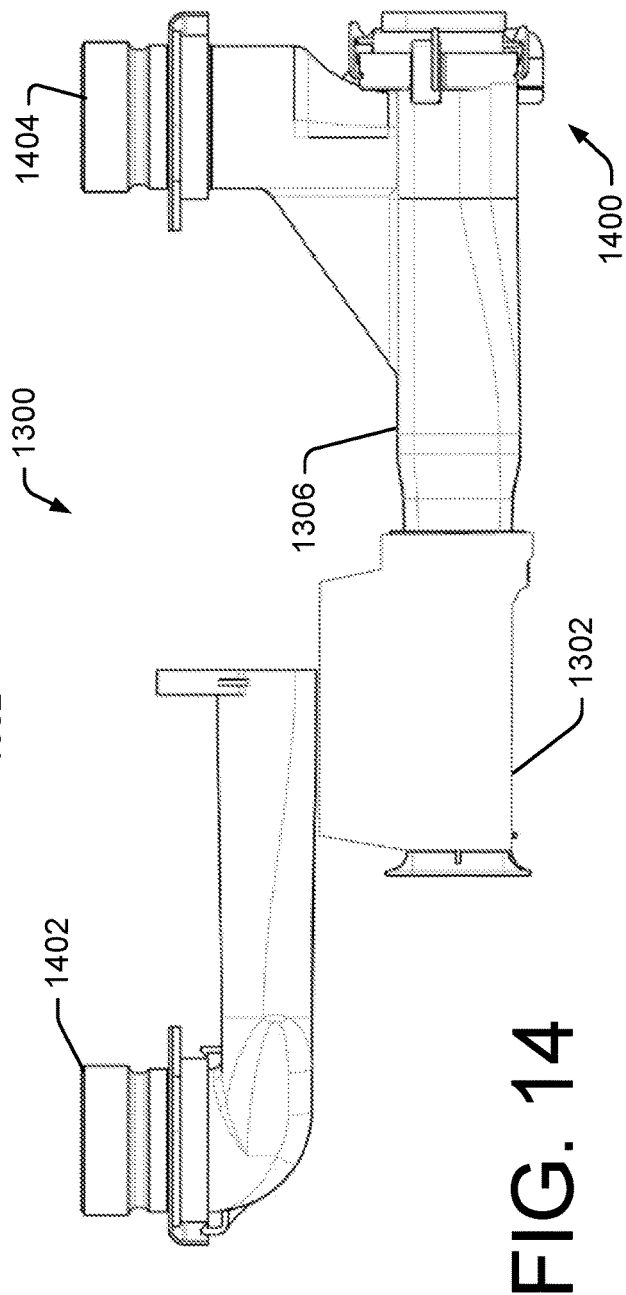
FIG. 14 is a side view of an example manifold, gas sensor module, and bypass module.

FIG. 14 shows a side-view of the example manifold assembly 1300. An input port 1402, an exhaust port 1404, and the manifold 1306 are shown. The valve assembly 1400 allows the exhaust port 1404 to be closed.

Figure 15:
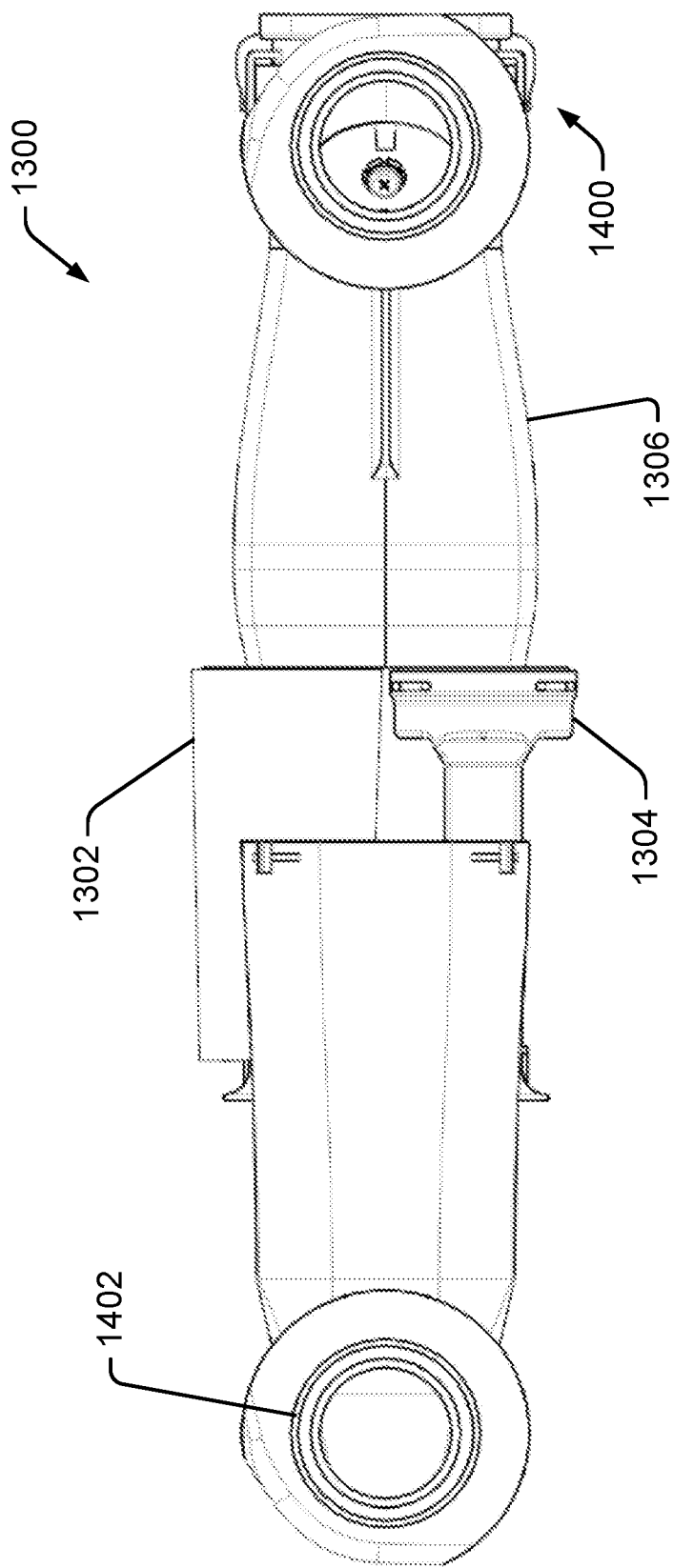
FIG. 15 is a top view of an example manifold, gas entry connector, and valve.

FIG. 15 is a top view of an example manifold assembly 1300. A gas entry connector or port 1402 and the shut-off valve 1400 are shown. The sensor module 1302 and bypass module 1304 are also shown.

Figure 16:
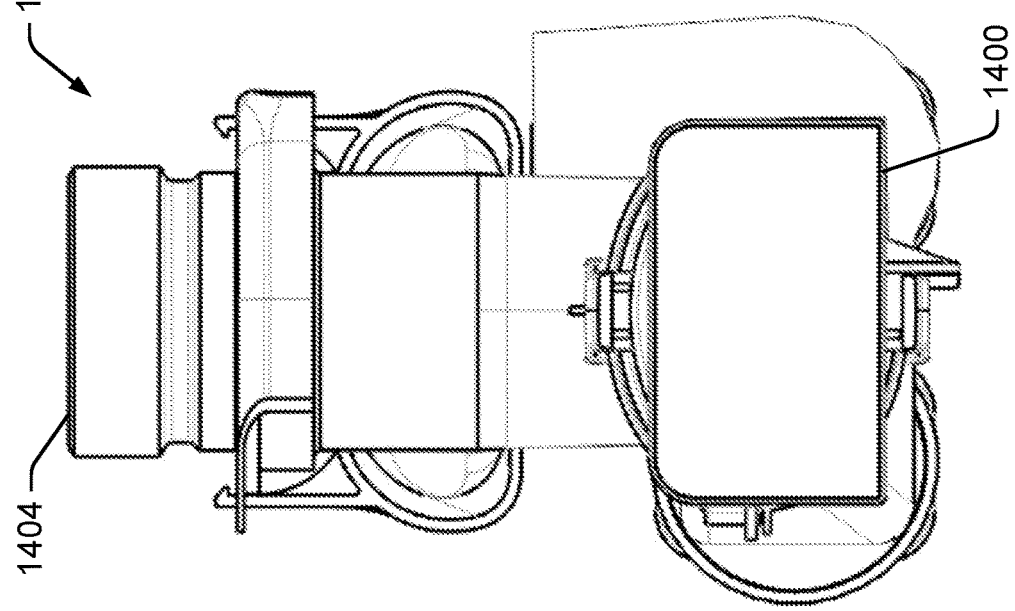
FIG. 16 is an end view of the manifold, showing the exhaust port and valve.

FIG. 16 is an end view of the manifold assembly 1300. The exhaust port 1404 and valve assembly 1400 are shown.

Figure 17:
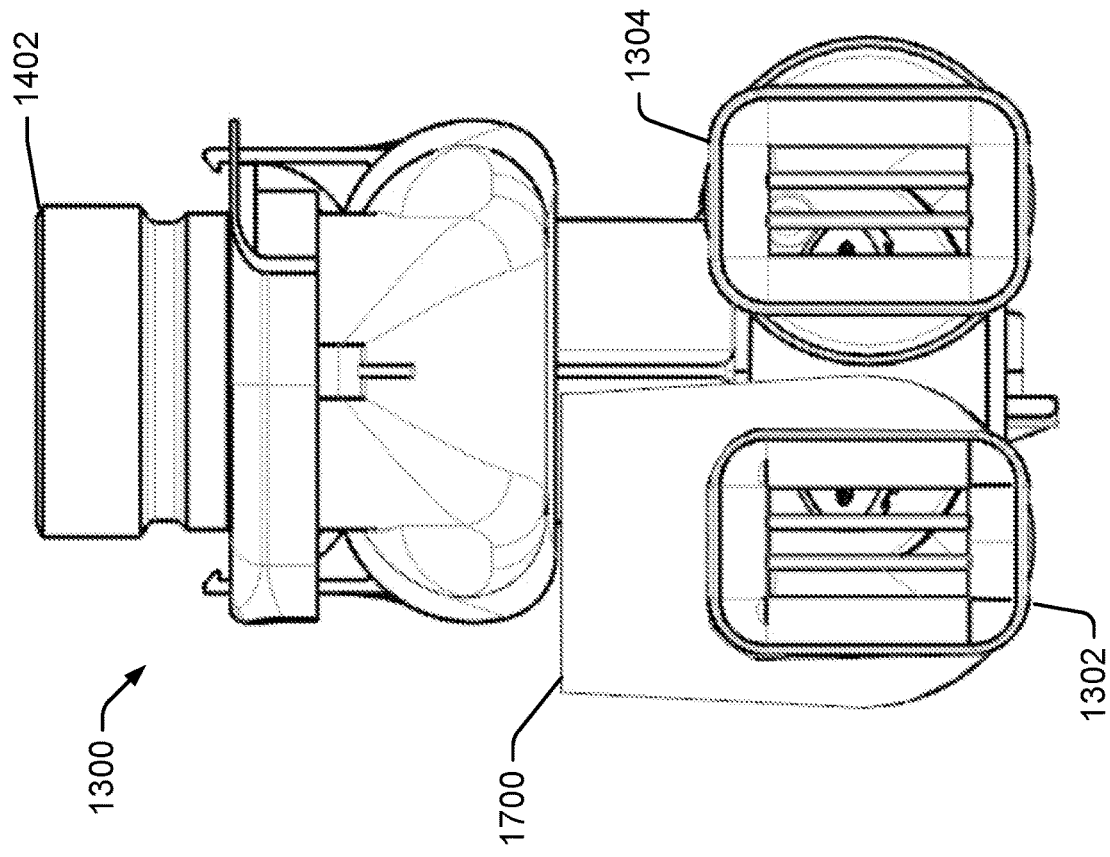
FIG. 17 is an end view of the manifold, bypass module, and sensor module and inlet valve.

FIG. 17 is an end view of the manifold assembly 1300, bypass module, and sensor module. The gas inlet port 1402 is shown. The sensor module 1302 and bypass module 1304 are attached to the manifold. Module 1700 encloses electronics, which may include one or more of a processing unit, memory device, and/or metrology sensor.

Figure 18:
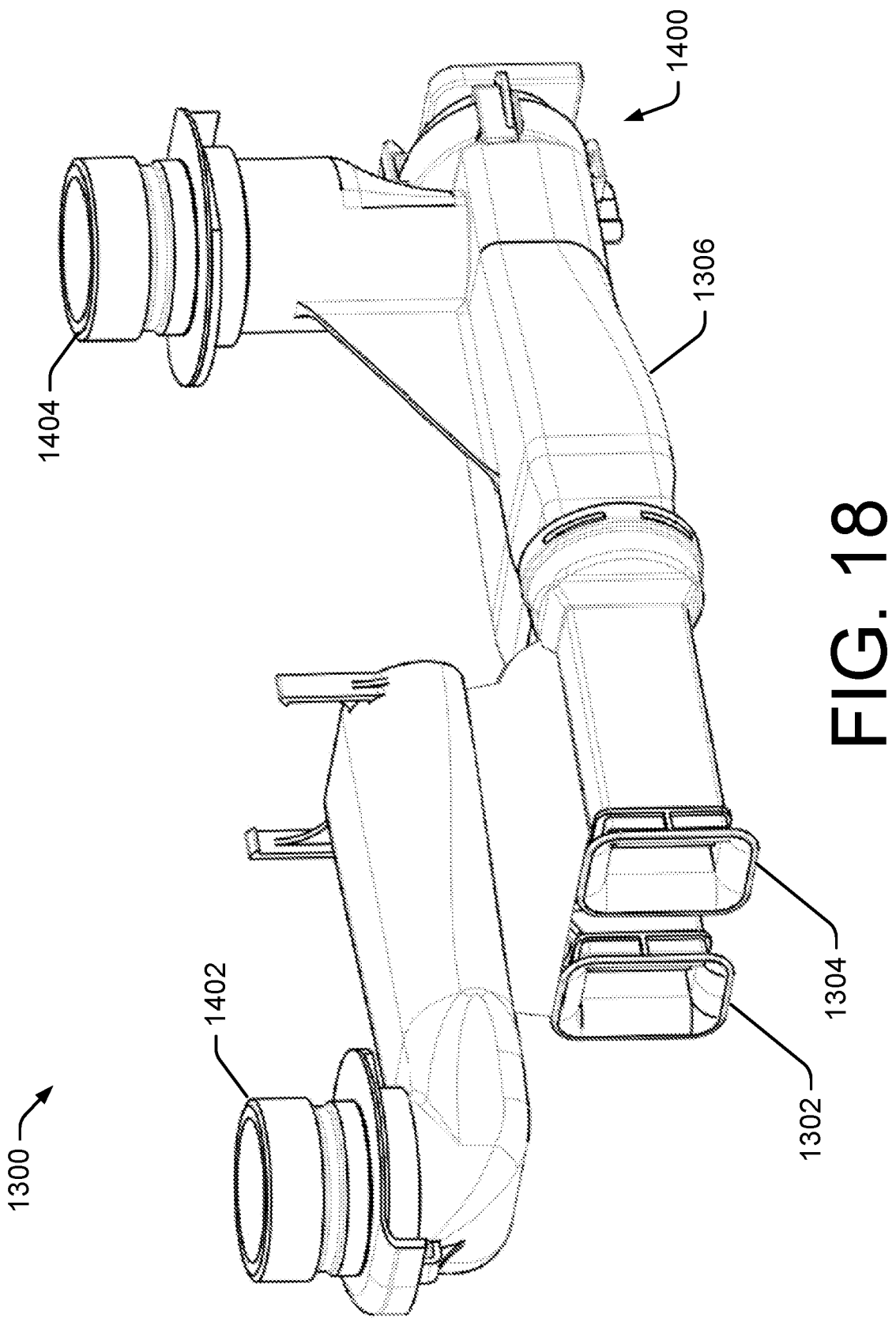
FIG. 18 is a perspective view of the manifold, bypass module, sensor module and valve.
Figure 19:
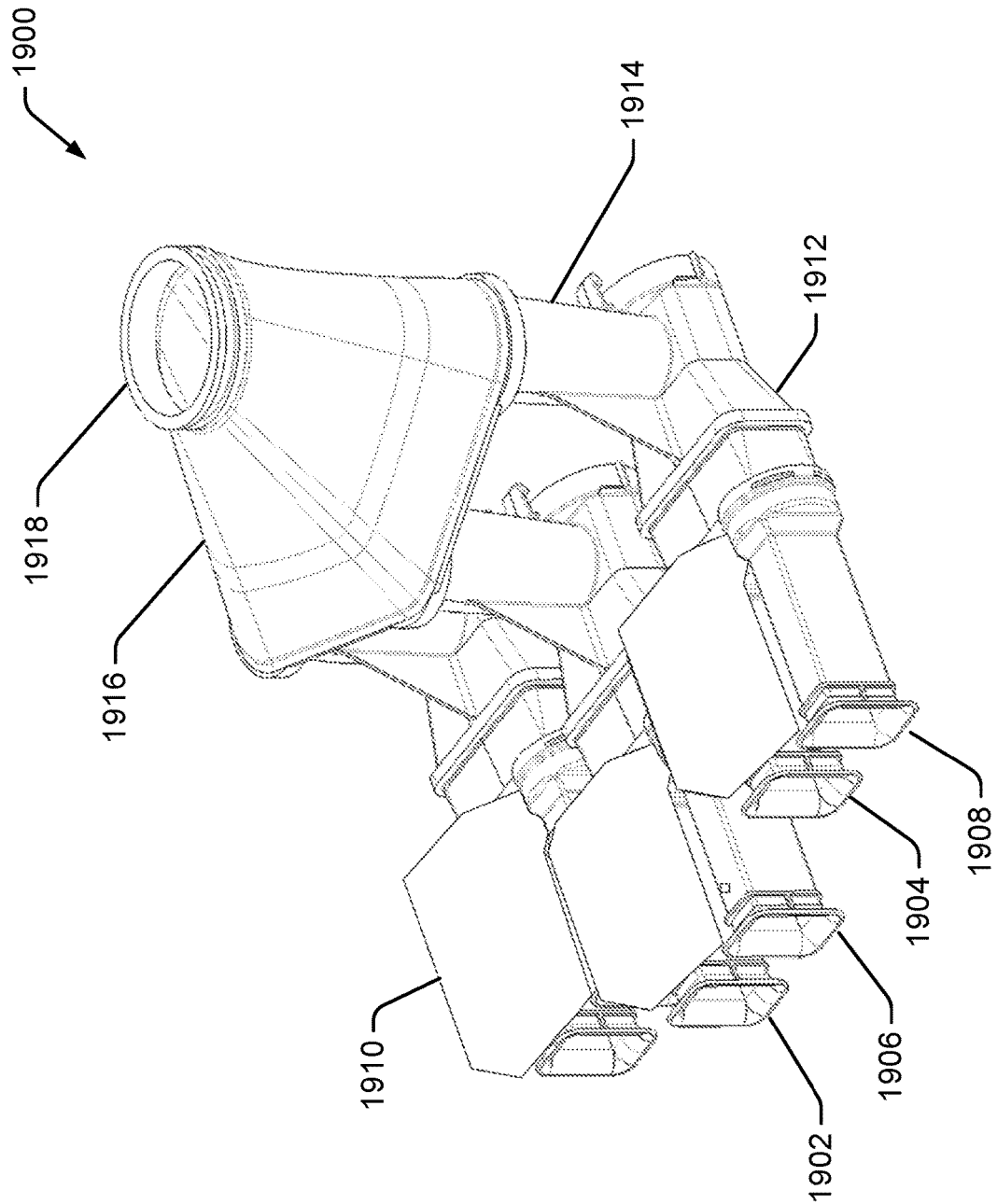
FIG. 19 is a perspective view of an example compound sensor and bypass assembly, wherein the example shows three pairs of sensor/bypass modules.

FIG. 18 is a perspective view of the manifold 1306, bypass module, sensor module and valve 1400. The entry port 1402 and exhaust port 1404 are shown. The sensor module 1302 and bypass module 1304 are FIG. 19 shows a compound manifold assembly 1900. In the example, three pairs of sensor modules and bypass modules are shown. Sensor modules 1902, 1904 are seen in the foreground, and are associated with respective bypass modules 1906, 1908. Each sensor module has an electronics module 1910, which may include one or more of a processor unit, a memory device, and/or a metrology sensor. Each sensor module and bypass module pair exhausts gas into a secondary manifold 1912. Each secondary manifold exhausts gas into a collector pipe 1914, which transfers gas to a primary manifold 1916. Gas is finally exhausted from an outlet 1918. The compound manifold assembly 1900 may be contained within an enclosure (not shown for clarity) of a gas meter.

In an example, any of the gas manifold assemblies of the previous figures (e.g., manifold assembly 200, 300, 600, 700, 1000, etc.) could be attached to the primary manifold 1916. Accordingly, a gas meter having a larger gas flowrate-measuring capacity could be configured with a primary manifold 1916 attached to (fed by) any combination (e.g., mix or match) of sensor module(s)/bypass module(s) of the earlier figures.

In some examples of the compound manifold assembly 1900, the assembly is configured so that a distance from an opening of each sensor module 1902 and each bypass module 1906 is the same distance. Such a configuration may result in increased accuracy of gas flowrate measurement.

In some examples, a position of the on/off valve of one or more of the manifold assemblies used to form the compound manifold assembly may be changed. Such valve settings may further customize the compound manifold assembly.

Figure 20:
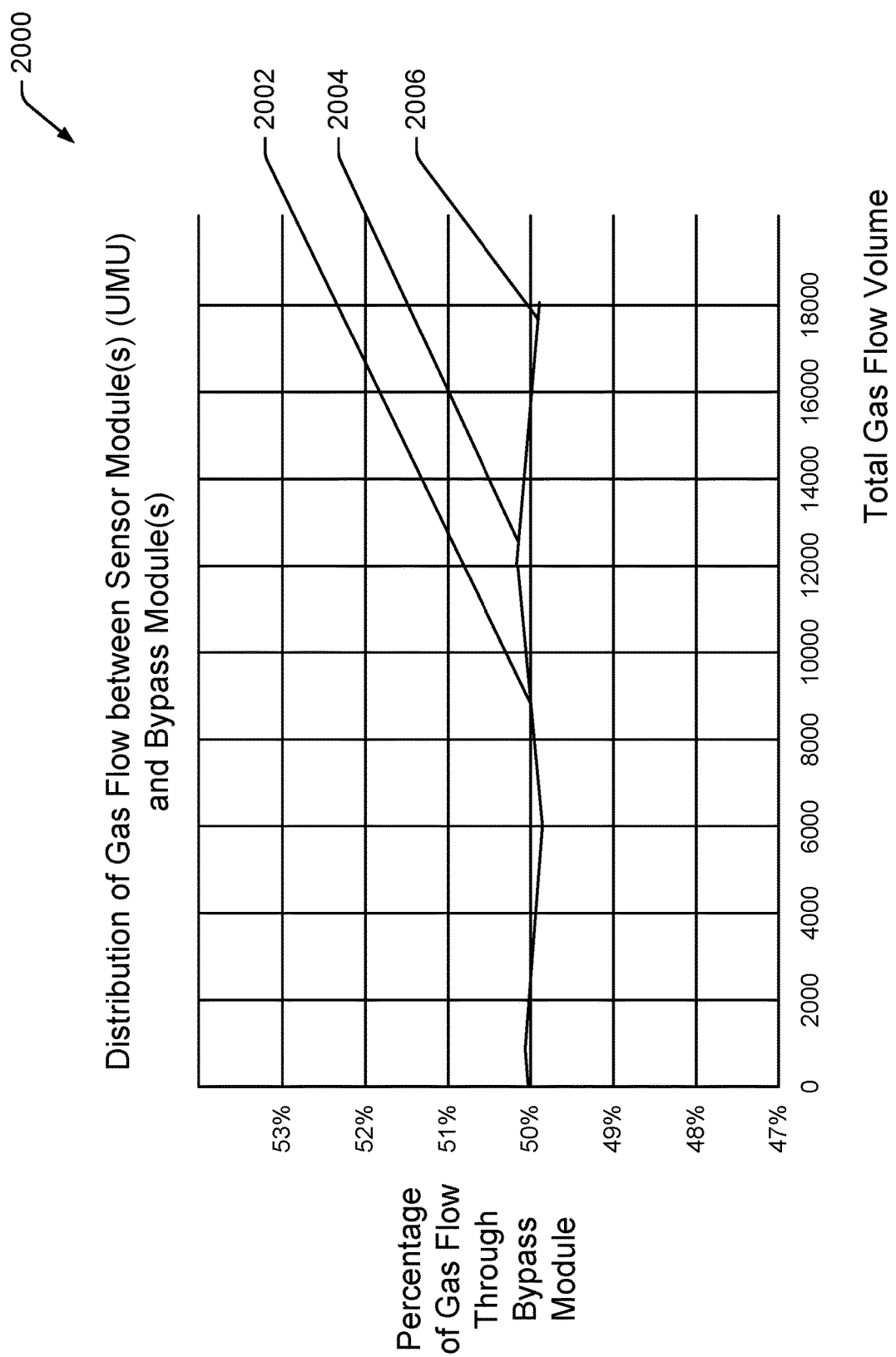
FIG. 20 is a chart showing an example of a bypass ratio (e.g., showing relative flowrates of measured gas, bypassed gas, and/or total gas) for different total or measured gas flowrates.

FIG. 20 shows an example chart 2000 illustrating a bypass ratio for different total gas flowrates. In some meters, a fixed percentage of gas flows through the sensor module. In an example, if 50% of the gas flow is though the sensor module, then total gas flow is twice measured gas flow. This calculation is easily made if a different fixed percentage of the gas flows through the sensor module.

In other meters, the percentage of gas flowing through the sensor module is fixed over time for any given gas flowrate. However, for different gas flowrates, the percentage of gas flowing through the sensor module varies. FIG. 19 addresses this issue. By experimentation, the graph and/or associated lookup table can be created. The experimentation may be made for any particular meter design or for any particular meter (i.e., a custom lookup table for each meter manufactured).

In operation, a gas meter may determine a sequence of flowrates, as a customer uses gas. Using a lookup table, a gas meter may determine an appropriate factor for each measured flowrate, to determine a total gas flowrate. Thus, gas measurement includes measuring a flowrate and obtaining a factor associated with the flowrate to yield total gas flowrate.

In the example 2000, the percentage of the gas passing through bypass module(s) is equal to the percentage of gas measured at 2002. The percentage of gas passing through bypass module(s) is slightly higher at 2004 and lower at 2006 than the percentage of gas passing through the sensor module.

Example Methods

Figure 21:
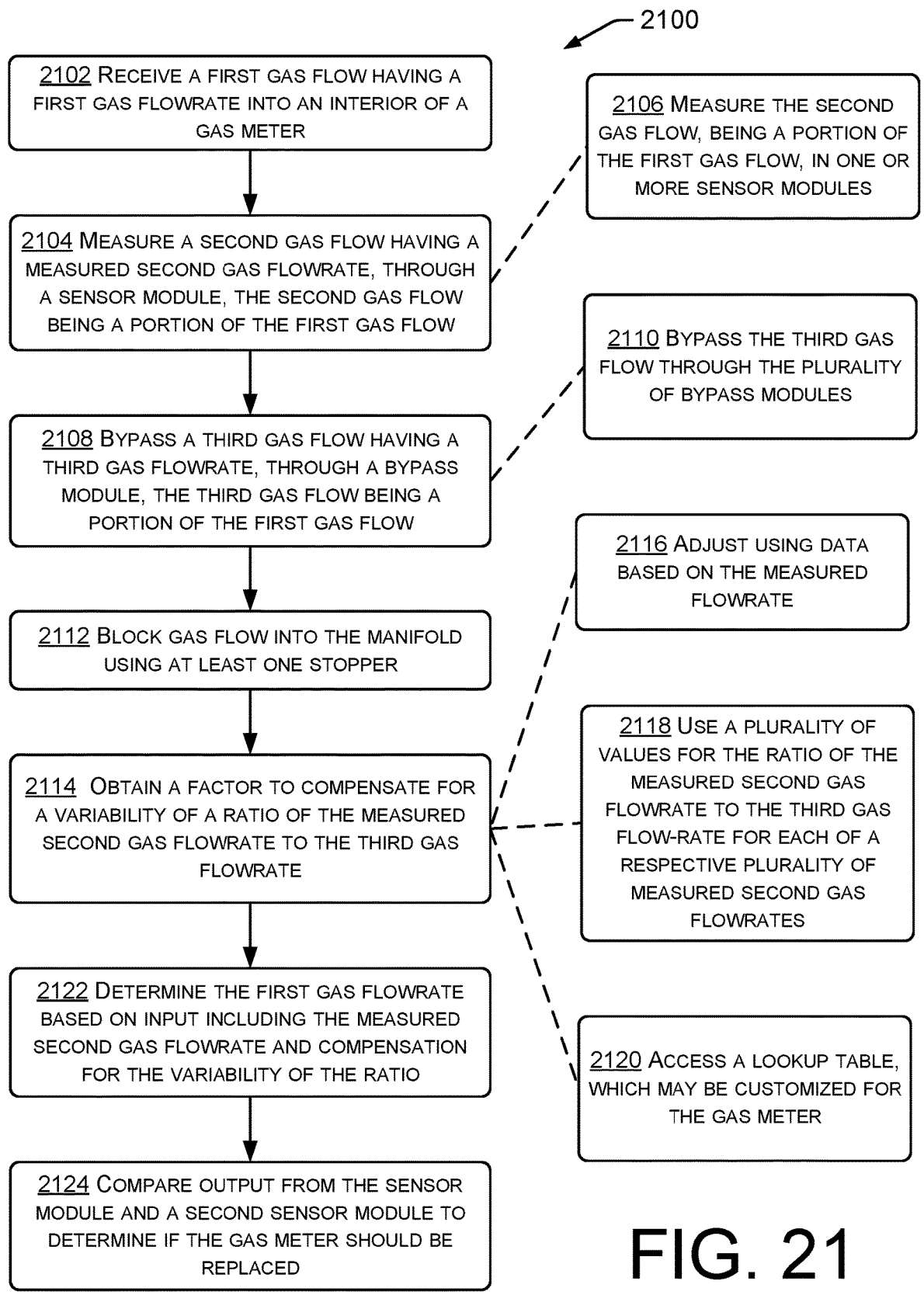
FIG. 21 is a flow diagram showing an example method by which a volume of gas is measured by a gas meter having a manifold with attached sensor module(s) and bypass module(s).

FIG. 21 shows example methods 2100 and operation of a gas meter. The methods and operation may be performed and/or directed by any desired processor, memory, integrated circuit, logic devices, programming, etc. A controller may include one or more of the processor, memory and/or other devices. The example methods of FIG. 21 may be implemented at least in part using the structures and techniques illustrated by FIGS. 1-20. However, the methods of FIG. 21 contain general applicability, and are not limited by other drawing figures and/or prior discussion. The functional blocks of FIG. 21 may be implemented by software and/or hardware structures or devices that are configured to operate a gas meter.

In some examples of the techniques discusses herein, the methods of operation may be performed by one or more application specific integrated circuits (ASIC) or may be performed by a general-purpose processor utilizing software defined in computer readable media. In the examples and techniques discussed herein, the memory 146 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

FIG. 21 shows an example method 2100 by which a volume of gas is measured in a gas meter having a manifold with attached sensor module(s) and bypass module(s). In the example, a gas flow is received by the gas meter. A portion of the gas flow is passes through a gas sensor module, where it is measured. Another portion of the gas flow passes through one or more bypass modules, thereby bypassing the gas sensor module. A manifold provides connectors to allow attachment of the gas sensor module(s) and/or the bypass module(s). A relationship between two or more of: a volume of gas flowing into the meter; a volume of gas flowing through the gas sensor module(s); and a volume of gas flowing through the bypass module(s) is known over a range of gas flowrates. Accordingly, by using the relationship and measured values from the gas sensor module, a flowrate of gas flowing through the meter, and a volume of gas that passed through the meter over time, can be determined.

At block 2102, a first gas flow having a first gas flowrate is received into an interior of a gas meter.

At block 2104, a second gas flow, having a measured second gas flowrate, is measured by operation of a sensor module. The measured second gas flowrate is a portion of the first (i.e., total) gas flow rate. In the example of block 2106, the measuring may be performed by one or more sensor modules. The sensor modules may be connected to a manifold within a gas meter.

At block 2108, a third gas flow bypasses the sensor module(s) and is carried by a bypass module. In the example of block 2110, the third gas flow bypasses the sensor module(s) by passing through a plurality of bypass modules.

In the example of block 2112, gas flow is blocked from flowing into the manifold by one or more stoppers or plugs. Accordingly, the gas is routed into the manifold through the sensor module(s) or the bypass module(s).

At block 2114, data (such as a multiplicative factor) is obtained to compensate for variability of a ratio of the measured second gas flowrate to the third gas flow rate. That variability is seen in FIG. 20. In an example, the variability (and compensation for the variability) may be based at least in part on the measured second gas flowrate. In an example, the variability may be based at least in part on a number of bypass modules used. In the example of block 2116, the gas flowrate through the meter is measured (e.g., a flowrate measured at the sensor module) and data (e.g., a multiplicative factor) based on the measured flowrate (e.g., data from FIG. 19 that indicates a factor to be used to at different gas flowrates to obtain the overall gas flowrate) is used to obtain the overall flowrate (i.e., measured plus bypassed flowrates). In an example of FIG. 20, the data or multiplicative factor is approximately 2 for most measured gas flows. That is, approximately half of the overall gas flow is measured, and the full gas flow is (approximately) the measured gas flow times two. However, for some gas flowrates, it is less than 2, and for some gas flowrates it is more than 2. Accordingly, there is variability in the multiplicative factor, which may be repeatedly updated from a lookup table, as the sensor module makes measurements. If an additional bypass module was used, the factor might increase. In the example of block 2118, a plurality of values may be used for the ratio of the measured second gas flowrate to the third gas flow-rate for each of a respective plurality of measured second gas flowrates. In the example of block 2120, a lookup table is accessed, which may be customized for the gas meter design, or for the gas meter individually.

Because ratio of any two of the measured gas flowrate, the bypassed gas flowrate, and the total gas flowrate, and the inverse of the ratios, all convey the same or similar information, any one of the ratios can be used as a factor to determine a total flowrate from a measured flowrate. Accordingly, statement of one relationship implies and includes the others.

At block 2122, the first gas flowrate is determined. The determination may be made based on input including the measured second gas flowrate and a compensation factor for the variability of a measured gas flowrate and a bypassed gas flowrate.

At block 2124, in an example, output from two sensor modules may be compared to determine if the output is within a threshold difference and/or whether the gas meter should be replaced. If the output of the two sensor modules have a ratio or other relationship that has changed, then that change may indicate a failure of the gas meter.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A gas meter, comprising:
an enclosure defining an inlet port, an outlet port, and an interior cavity;
a manifold located within the interior cavity of the enclosure, comprising a first connector, a second connector, and a third connector, wherein the manifold is connected to the outlet port to exhaust gas through the outlet port;
a sensor module, connected to the first connector of the manifold, and configured to measure a first gas flowrate from the interior cavity of the enclosure, through the sensor module, through the manifold and out the outlet port;
a bypass module, connected to the second connector of the manifold, to direct a second gas flow having a second gas flowrate from the interior cavity of the enclosure, through the bypass module, through the manifold, and out the outlet port;
a plug connected to the third connector, to block gas flow from entering the manifold through the third connector; and
a processor to compute a gas flowrate through the gas meter using inputs comprising:
a measured flowrate through the sensor module;
a first adjustment factor associated with a first measurement by the sensor module; and
a second adjustment factor associated with a second measurement by the sensor module, the second adjustment factor being different than the first adjustment factor.

2. The gas meter as recited in claim 1, additionally comprising:
one or more baffles within the interior cavity of the gas meter to redirect gas flow through the interior cavity of the gas meter.

3. The gas meter as recited in claim 1, wherein the bypass module has a flow passage that is approximately the same as the flow passage of the sensor module.

4. The gas meter as recited in claim 1, additionally comprising:
a second sensor module; and
a memory device;
wherein the processor compares data from the sensor module and the second sensor module to determine whether the data is within a threshold difference.

5. The gas meter of claim 1, wherein the first adjustment factor and the second adjustment factor are based at least in part on a look-up table, and wherein the look-up table provides a relationship between at least two measured flowrates of gas and at least two respective percentages of gas that pass through the bypass module at the at least two measured flowrates.

6. A gas meter, comprising:
a manifold comprising a first connector, a second connector, and an exhaust port;
a sensor module, connected to the first connector of the manifold, to measure a first gas flow having a first flowrate through the sensor module and into the manifold;
a bypass module, connected to the second connector of the manifold, to direct a second gas flow having a second flowrate through the bypass module; and
a processor to calculate a gas flowrate through the gas meter using inputs comprising:
the first gas flow through the sensor module;
a first adjustment factor associated with a first measurement by the sensor module; and
a second adjustment factor associated with a second measurement by the sensor module, the second adjustment factor being different than the first adjustment factor.

7. The gas meter as recited in claim 6, wherein the processor is additionally configured to calculate the gas flowrate using inputs comprising:
a number of bypass modules.

8. The gas meter as recited in claim 6, wherein a ratio of the first flowrate and the second flowrate is approximately fixed over a range of gas flowrates through the exhaust port.

9. The gas meter as recited in claim 6, wherein a ratio of the first flowrate and the second flowrate is variable over a lifecycle of the gas meter, and wherein:
the processor is additionally configured to calculate an adjustment to compensate for variations in the ratio of the rate of the first gas flow and a rate of the second gas flow over the lifecycle of the gas meter.

10. The gas meter as recited in claim 6, additionally comprising:
- a third connector of the manifold; and
- a second bypass module connected to the third connector.

11. The gas meter as recited in claim 6, additionally comprising:
- a third connector of the manifold; and
- a plug connected to third connector, to block gas flow into the third connector.

12. The gas meter as recited in claim 6, additionally comprising:
- a third connector of the manifold; and
- a second bypass module connected to the third connector.

13. The gas meter of claim 6, additionally comprising:
- an enclosure having an entry port and an interior cavity;
- wherein the sensor module and the bypass module are on a first side of the interior cavity and the entry port is on a second side of the interior cavity that is opposite the first side of the interior cavity.

14. A method of measuring gas flow, comprising:
- receiving a first gas flow having a first gas flowrate into an interior of a gas meter;
- measuring a second gas flow to thereby obtain a first measurement and a second measurement, wherein the measuring is performed by a sensor module and the second gas flow is a first portion of the first gas flow;
- bypassing a third gas flow having a third gas flowrate, through a bypass module, the third gas flow being a second portion of the first gas flow and being separate from the second gas flow;
- obtaining factors based at least in part on measurements of the second gas flow, wherein a first factor associated with a first measurement by the sensor module is different from a second factor associated with a second measurement by the sensor module; and
- determining the first gas flowrate based on inputs comprising:
  - the first measurement and the first factor; and
  - the second measurement and the second factor.

15. The method as recited in claim 14, wherein the bypass module is one of a plurality of bypass modules, and wherein bypassing the third gas flow comprises:
- bypassing the third gas flow through the plurality of bypass modules.

16. The method as recited in claim 14, wherein the sensor module is one of two sensor modules, and wherein the method additionally comprises:
- comparing output from the two sensor modules; and
- determining if the gas meter should be replaced, based on the comparison.

17. The method as recited in claim 14, wherein obtaining the first factor and the second factor is based at least in part on accessing a look-up table.

18. The method as recited in claim 14, wherein exhaust gas of the sensor module and the bypass module flows into a manifold, and wherein the method additionally comprises:
- blocking gas flow into the manifold in at least one location using at least one plug in at least one respective bypass module connector.

19. The method as recited in claim 14, wherein:
- measuring the second gas flow comprises directing gas from the interior of the gas meter through the sensor module and into a manifold; and
- bypassing the third gas flow comprises directing gas from the interior of the gas meter through the bypass module and at least one other bypass module and into the manifold.

20. The method of claim 17, wherein the look-up table provides a relationship between at least two measured flowrates of gas and at least two respective percentages of gas that pass through the bypass module at the at least two measured flowrates.

* * * * *